Patented May 15, 1951

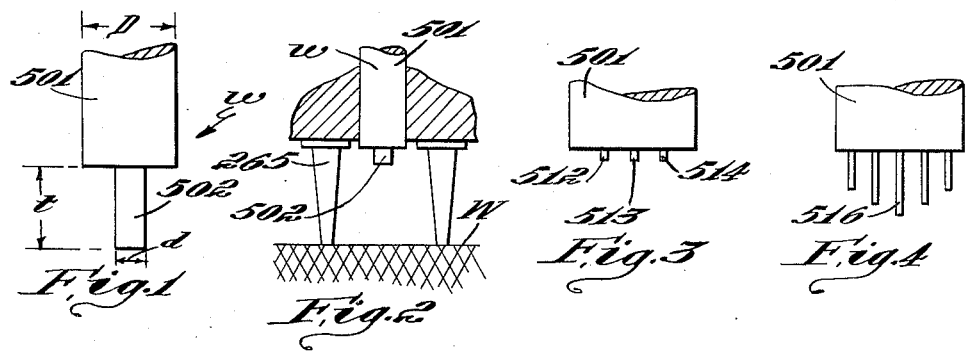
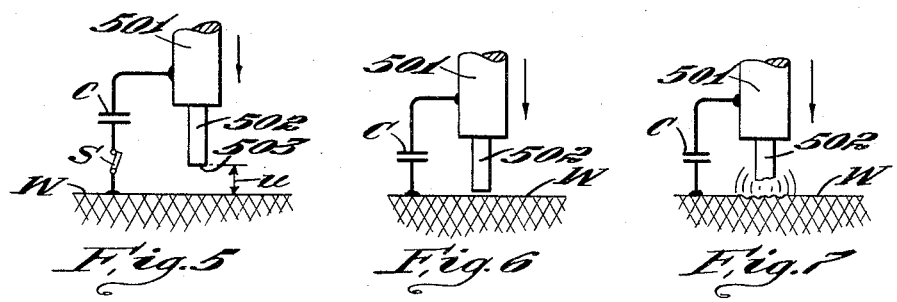
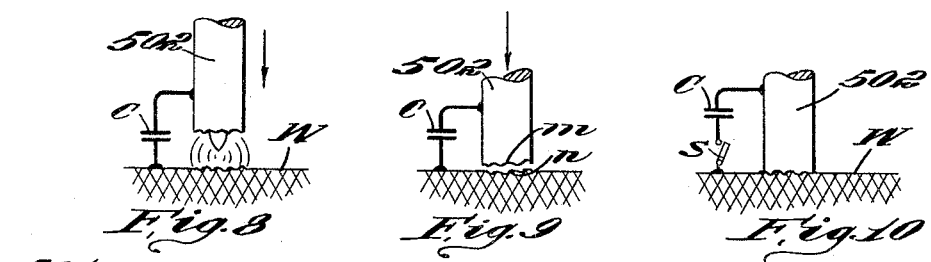
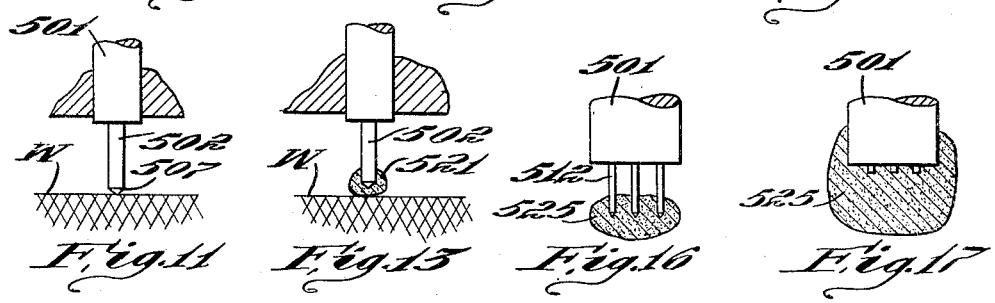
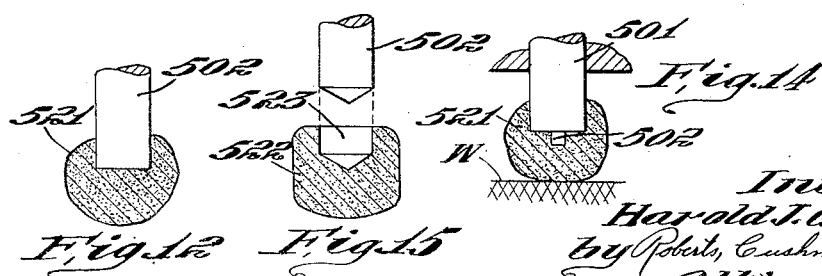

2,553,499

UNITED STATES PATENT OFFICE 2,553,499

WELDING METHOD

Harold J. Graham, Highland Park, Mich., assignor to Graham Manufacturing Corporation, Detroit, Mich., a corporation of Michigan Application January 17, 1950, Serial No. 139,079

15 Claims. (Cl. 219—10)

The present invention relates to an electric welding method wherein a welding current impulse is applied concomitantly with a mechanical force tending to unite the construction elements to be joined, and to stud or pin-like work pieces suited for use according to that method. This is a continuation in part of my copending application, Serial No. 43,498, filed August 10, 1948, now Patent No. 2,518,463, dated August 15, 1950.

It has heretofore been proposed (for example in United States Patent No. 1,066,468 to Chubb) to apply a percussive blow to two work pieces, for examples wires, while directing a welding current through the two pieces. However, these previously proposed systems require rather elaborate current timing, work holding, and blow applying mechanisms for correlating the mechanical and electrical energy impulses; in most instances such provisions are made necessary due to the fact that the work pieces are first brought into contact, whereupon an arc is drawn and thereafter the percussion blow applied.

It is one of the main objects of the present invention to provide an extremely simple, rugged and yet reliable system for the application of a mechanical force and an electric welding impulse to two work pieces to be joined with welding apparatus of the type dealt with in my Patent No. 2,467,379 and in my copending application Serial No. 700,136, now Patent No. 2,510,101, dated June 6, 1950, of which the above copending application Serial No. 43,498 is in part a continuation.

Other objects of the invention are to provide a welding method of the above general type which does not necessarily require special provisions for holding the two work pieces in exact correlation, which requires minimum skill for preparing the work preliminary to welding and for carrying out the welding operation proper; to provide in equipment of this type for positive correlation of a loose work piece such as a stud according to the invention and a stationary work piece or tool element without direct electrical contact between these pieces; to provide studs fabricated to promote such welding; and to provide a welding system including a percussion welding tool and a circuit particularly suited, according to the invention, for operation with tools that can be adapted for operation with a welding circuit closed by a contact maker within the tool, or by a contact maker separated therefrom and associated with an automatic control circuit.

Additional objects are to provide welding studs of peculiar shape or composition which are particularly suited for percussion welding of the above indicated type, are inexpensive and can be easily adapted for satisfactory operation under various working conditions and for various metals to be welded; and to provide a method of utilizing to best advantage such studs and stud welding apparatus.

As set forth in the above mentioned application Serial No. 43,498, I weld a rod or block shaped metal body (herein referred to as stud) to a surface intersecting the general direction of the stud, by providing one end of the stud with a substantially high resistance portion which offers a contact area considerably smaller than the cross sectional area of the stud, by contacting this end portion with the surface to which the stud is to be welded, and by sending a current through the stud and the surface while applying thereto pressure which as to intensity and time characteristic may vary between that exerted by a pneumatic tool and that applied as percussive blow by a spring operated tool, whereby the high current density due to the reduced current carrying capacity of the narrow cross section at the contact portion imparts to the metal at that point a high temperature causing it to melt which instantaneous melting separates the end of the stud from the surface, effecting the formation of an arc. This reduced tip portion of the stud may be constituted by a wedge shaped or circular edge, a point, or simply an uneven such as slipped off end surface or, instead of shaping the end of the stud as indicated above, it might be reduced in cross section through an appreciable length for the same purpose, namely to cause initial flow of current sufficiently high to melt the material of the stud end so as initially to distance stud and work piece not only to facilitate arc formation by ionizing and concomitantly widening the gap between stud and work piece but also by melting both work pieces.

Studs for carrying out this method of welding may comprise a smooth shank portion and a tip portion (herein also referred to as wire) extending in axial direction from the shank portion with a cross sectional area substantially smaller than that of the shank portion, the ratio of length to cross section of the tip portion or wire being selected to provide a current density sufficient to melt the wire before the stud proper has reached the other work piece. The cross sectional area of the wire tip should be substantially smaller than that of the shank portion, such that the ratio of length to cross section of this tip portion provides a current density sufficient to melt it during the time required by the stud to traverse the length of the tip wire when moved by a force sufficient to fuse the adjacent surfaces of stud and work piece, melted by the arc that is initiated by the melting wire. Instead of using a single tip wire, several wires may be arranged at the tip of the stud, depending upon the cross sectional area of the stud proper, as will be described more in detail hereinbelow. The above statements concerning the cross section and length of a single wire tip are analogously applicable to the combined cross sectional area of a multiwire tipped stud. Apparatus for welding in this manner with the work pieces initially in mechanical contact is described in my Patent No. 2,467,379.

My welding technique further contemplates the distancing of stud and work piece not by means of specially shaped stud tips as indicated above, but by initially distancing the two work pieces; in accordance with this aspect of the invention the stud is held approximately normal to the surface at a predetermined distance therefrom, whereupon complete electrical connection from the work pieces to the respective terminals of a voltage source is established and immediately thereon a blow is dealt to the stud to contact it with the larger work piece, the initial gap being wide enough to prevent formation of an arc prior to the blow and sufficiently narrow to cause upon approach of the work pieces a melting of metal sufficient to establish metallic juncture but insufficient to cause penetration of an unmelted portion of the stud; apparatus for carrying out this method is described, in various embodiments and possibilities, in my above-mentioned copending application and also in copending application Serial No. 81,130, filed March 12, 1949.

In one of the main aspects of the present invention the initial gap between the work pieces, desirable for mechanical as well as electrical purposes, is provided by covering an end of the stud with a breakable insulating head, which is initially contacted with the larger surface whereupon a voltage is applied to stud and surface and a mechanical force applied to the stud which blow shatters the head whereupon the welding area becomes ionized to form an arc prior to full impact of the stud on the surface; it will be evident that this method is to some extent equivalent to initially spacing the stud by means of apparatus peculiarly suited for that mode of carrying out the invention whereas it does not necessitate such special provisions for spacing but can be carried out with apparatus contemplating initial pressurable contact of stud and work piece as disclosed in my Patent No. 2,467,379; in this instance the insulating head takes the place of the spacing members dealt with in my other copending applications Serial Nos. 700,136 and 81,130.

The above-mentioned gap forming head is according to the invention, a compact mass of fairly stiff and essentially brittle insulating material which disintegrates when the stud is dealt a blow while the head rests on the work piece; in order to promote the disintegration of the head it may also contain, in addition to the basic ingredient which serves the separating and insulating functions, an agent which explodes when the stud is dealt the blow while the head rests on the work piece, or when the welding zone temperature rises upon arc formation. The head may further contain dispersed therein an agent forming an inert gas upon being heated or mechanically disturbed which inert gas protects the welding zone. The head may still further contain a fusing agent promoting the joining of the two work pieces.

It will be noted that the distancing with an actual air gap between the work pieces, the insulating head, and the directly contacting appreciably reduced wire tip all perform the function of providing an initial gap prior to, during and immediately following the blow, or at least during and immediately following the blow (in the case of uneven or wire tip), which gap can be controlled by means of stud tip configuration, tip wire dimensions or head size and material to provide the correct timing together with the correct amount, temperature and incidence of melted material furnishing on the one hand clean and strong welds without burnt, spreading or otherwise qualitatively reduced immediate environment of the weld and on the other hand preventing complete penetration of the stud through the work piece which is in many instances quite thin.

In order to provide an inert atmosphere for the point of welding, there may be provided instead of the above-mentioned gas developing head a duct associated with the tool holder or a spacer, or separately extending towards the welding area, through which an inert gas can be supplied to the gap between work piece and stud; this gas supply is controlled by instrumentalities correlated with the actuator for the percussion tool or by that tool itself, such as the hammer or the stud carrying element. Apparatus of this type is dealt with more specifically in my copending application Serial No. 81,130.

These and other objects, aspects and features appear in the following description of several typical practical embodiments illustrating the novel characteristics of my invention. This description refers to drawings in which Fig. 1 is an elevation of a wire tipped stud according to my invention;

Fig. 2 indicates the association of a stud according to Fig. 1;

Figs. 3 and 4 are elevations of multitip studs;

Figs. 5 to 10 illustrate the method of welding according to my invention with tipped studs according to Figs. 1 to 4;

Fig. 11 is an elevation of a stud according to Fig. 1 but having a pointed tip;

Figs. 12 and 13 are elevations, with the head in section of studs according to Fig. 11 but provided with distancing heads;

Fig. 14 is an elevation of a stud according to Figs. 1 and 2, provided in addition with a dissancing head;

Fig. 15 is a sectional elevation of a separately fabricated head, with the stud fitting the head indicated in relation thereto; and Figs. 16 and 17 are elevations, with the heads in section, of studs according to Fig. 3, but provided with individual heads, and a single head, respectively.

Although the welding systems described in my above-mentioned patent and copending applications are under many conditions quite satisfactory when operated with the likewise therein described studs having uneven, rough, wedge shaped or cup shaped tips, I found that the welding technique and the studs of the type now to be described are often preferable, especially for high speed production work.

With apparatus incorporating spacer elements studs $w$ of the shape indicated in Fig. 1 may be used to great advantage. These studs, sometimes referred to as "wire tip studs" have a shank portion 501 dimensioned for insertion in the holder portion 240 of apparatus such as described in the above-mentioned applications. Integral with this shank portion 501 is a tip or wire portion 502 with a diameter $d$ appreciably reduced as compared with diameter D of shank 501, and extending with a length $t$ in axial direction beyond shank 501. The dimensions $d$ and $t$ are to some extent critical and in each particular case selected with regard to certain considerations which will be discussed in detail hereinbelow. Fig. 2 indicates the location of such a stud, inserted into the holder of the tool with relation to a work piece W from which it is distanced by appropriate spacer member 265 (Fig. 2). Studs of this general type may also be used with tools of the kind described in my above-mentioned patent, in which case they are preferably provided with an uneven extreme end surface such as described therein or, electrical conditions permitting, with a wire tip which is sufficiently sturdy to withstand pressurable contact with the stationary work piece, as exerted with tools lacking spacing members.

For use with tools of the type illustrated in my above patent, the studs may be initially spaced from the stationary work piece W by providing them with an insulating head in the manner to be described more in detail hereinbelow. Especially in the case of studs of comparatively large diameter it was found desirable to employ several wire tips as indicated at 512, 513, 514 of Fig. 3. These wire tips may be of equal length or, as indicated in Fig. 4, they may be of unequal length, preferably with the center tip 516 longer than the others, although it may in certain instances be desirable to make the center tips shorter than those on the periphery of the stud end.

The functioning of wire tipped studs according to Figs. 1 to 4 will now be explained with reference to Figs. 5 to 9.

The stud is spaced from work piece W by appropriate means such as a spacing tool or head, the spacing being indicated at $u$. The work pieces, namely stud $w$ with shank 501 and wire tip 502 and work piece W, are connected to respective terminals of a source of electrical energy, indicated by capacitor C, by means of a normally open switch S. Closing of the switch applies an appropriate potential difference defined by capacitor C to the respective work pieces, whereupon the stud is rapidly moved towards work piece W. With the end 503 of tip 502 close to or touching but not necessarily firmly contacting work piece W (Fig. 6) a short arc is initiated between pieces $w$ and W (Fig. 7) and current begins to flow through tip portion 502 immediately bringing it to a temperature high enough to melt and to evaporate this portion 502 before the end $n$ of the stud shank proper 501 reaches work piece W. The tip is disintegrated and consumed with its mass broken up into gases which for all practical purposes becomes a conductor by ionizing the air. In this manner a small portion of the energy stored in the capacitor C is used to initiate the arc whereas the remaining energy is used to melt the flat surfaces $m$, $n$ of stud and work piece respectively. The end surface $m$ of shank 501 (tip 502 now having practically evaporated) and the opposite area $n$ of work piece W are now intensely hot with this metal rapidly melting. At this stage the stud proper has approached the work piece somewhat more closely without however reaching it. During the immediately following stage, indicated in Fig. 9, the stud shank end $m$ is quite close to the work piece surface $n$ with the stud wire tip evaporated, a heating arc still effective, and both surfaces $m$ and $n$ quite soft and flowing ready to be fused. The stud proper then reaches the work piece W with pressurable contact, as indicated in Fig. 10 and the two surfaces amalgamate. With the wire stud properly dimensioned, there is no danger of the stud penetrating the work piece W which might be quite thin, and no danger of causing a zone of uneven oxidized or otherwise detrimentally effected material at the juncture of shank 501 and work piece W. The voltage is at that time removed as indicated in Fig. 10 by open switch S; this switching operation is performed by the tool used for moving the stud, of the type above described. This switch is however not absolutely necessary, the voltage having at that time sufficiently decayed through discharge of the capacitor.

As mentioned above, both length and cross section of the wire tip (as for example defined by dimensions $t$ and $d$) are critical since they define the resistance element which disintegrates and ionizes the arc region during the welding period described above with reference to Figs. 7 to 9. The proper correlation between length and cross sectional area of the tip wire can be expressed in terms of current density as related to the time needed by the end $m$ of the stud shank proper to reach the area $n$ of the welding surface W, or by the caloric energy needed for melting the mass of the wire tip during the time needed by the shank end $m$ to reach area $n$. These relations depend upon the working conditions prevailing, including the material to be welded, the mass of stud and work piece W, the pressure exerted upon the stud, the welding voltage, and the initial distances $u$ and $t+u$ of tip 502 and stud proper 501 from the work piece W. In addition, there has to be considered the pressure, sometimes amounting to a blow which is applied to the stud. This joining force can be controlled particularly well with pneumatically or hydraulically controlled apparatus of the type described in my copending application Serial No. 81,130.

A principal criterion of properly selected stud dimensions and voltage and pressure values is the complete consumption of the tip portion 502. This tip has to be entirely consumed in order to prevent any remnant protruding beyond face $m$ from piercing the work piece W, especially if it is comparatively thin. Having this criterion in mind, the welding process according to the invention can be analyzed as comprising two principal phases, namely first the initial electrical insertion of the tip or wire of reduced diameter into the closed circuit during which period the tip is at least partly consumed causing ionization of the air to initiate an arc, and following a period during which the current maintained by the arc melts the remaining tip portion and the opposite surfaces of stud and stationary work piece, so that the final effect of the mechanical pressure is enabled to cause the amalgamating of the two pieces. It will be noted that this technique does not require mechanical or electrical timing apparatus for determining periods of arc drawing and metal melting but controls the welding operation by selection of such inherent characteristics as stud dimension; distance of the two work pieces, speed of approach, and applied voltage. This technique, speed of approach, avoids one of the principal defects of conventional welding methods namely that of molten metal oozing out around the sides of the studs. Welds made according to applicant's method with his special studs are perfectly clear and without fillets or burrs which are often undesirable if a washer is to be placed over the stud flat against the work piece. As compared with conventional methods, applicant's welding period is materially shortened, since the time for drawing an arc by separating the two work pieces from each other is eliminated and arc initiation and drawing, the metal melting, and work piece interpretation and fusing are all carried out during a single forward stroke, these operations requiring less than half the time needed for drawing an arc by pulling the pieces apart, stopping them and then again moving them towards each other. The time from the beginning of current flow to the actual welding contact is shorter than one five hundredth, usually about one thousandth of a second in applicant's method as compared to about a thirtieth of a second with conventional methods.

Each of the above mentioned working characteristics has an optimum value under given working conditions, so that the overall optimum possible under the circumstances can hardly be theoretically predicted but is best found by judicious selection and experiment. However the above described mode of operation, namely the setting free of sufficient heat to melt during one stroke the stud tip for purposes of arc initiating and sufficient heating of both surfaces to be joined, quite definitely determines the relation if not each individual value of these values and dimensions.

I found that the diameter and length of the wire tip 502 are less critical if the speed of approach and the percussion pressure are controlled which is possible in my pneumatic welding machine as described in the above-mentioned copending application Serial No. 81,130. If the pressure cannot be very exactly controlled for example if a spring operated tool such as shown in my Patent No. 2,467,379 is used, the tip dimensions are somewhat more critical. For welding with a pneumatic tool a tip $\frac{1}{16}''$ long and $\frac{1}{32}''$ to $\frac{3}{64}''$ in diameter was found to be satisfactory in most instances, provided that the speed of approach is approximately 75 feet per second, the final pressure about 350 lbs. per square inch, and the effective potential difference about 90 volts. With these values the initial current density in the stud is approximately 300,000 amperes per square inch. These values are recommended at least as guides for initial experimental performance with studs of $\frac{1}{4}''$ shank diameter and fixed work pieces not thinner than approximately 0.02''. The above data apply particularly to work pieces of mild steel or aluminum. It will be noted that the figures exaggerate the tip dimension in order to facilitate the showing.

As indicated in Fig. 11, the reduced or wire tip of welding studs according to Figs. 1 to 10 may be provided with an uneven contact surface such as a point 507 as described in my above patent, or a circular or wedge shaped edge such as described in application Serial No. 700,136. I found that a wire tip according to Fig. 1 considerably improves the technique; particularly seams can be essentially avoided by properly correlating stud dimensions and welding conditions as above described with reference to Figs. 5 to 10.

It will be evident that the stud proper as well as tip wire is not necessarily uniformly round but may have other cross sections such as square or hexagonal.

As mentioned above, the spacing of the stud from the large work piece W may be accomplished by means of an insulating head such as shown in Figs. 12 to 17. Heads of this type may be applied to studs of essentially uniform diameter as shown in Fig. 12, or, as shown in Figs. 13 and 14 they can be used with tipped studs according to Fig. 1. In their simplest form these heads such as shown at 521 of Figs. 12 and 13, are made of a brittle insulating body consisting for example of clay with water glass as a binder. Instead of clay with a binder, plaster of Paris may be used. In a preferred embodiment, the head is applied to the tip by dipping the latter into a paste composed of the above substances. This dipped head is then dried either at normal temperature during a more or less prolonged time, or by baking if desirable on a conveyor belt slowly travelling through a drying oven.

The tips can also be made separately by pressing, molding or any other convenient and conventional technique and applied to the studs prior to welding. A head of this type is shown at 522 of Fig. 15. The shape of the recess 523 of the head 522 conforms approximately to that of the stud end and is made to fit the stud sufficiently tight so that it will be retained thereon during the short time from application thereto until the welding operation. For use with such heads the stud end may be pointed as indicated in Figs. 13 to 16, in order to promote disintegration of the head.

In the case of tipped studs the head may be attached to the shank including the tip, as shown in Fig. 14, or only to the tip as shown in Fig. 13.

Stud heads of the above described type are brittle and thin enough to disintegrate upon pressurable contact of the two work pieces, providing at that instant the distance between the two work pieces which is required for initiating the welding arc. Under certain circumstances this manner of initial distancing may be superior to that provided by unevenness or pointing of the stud as described in my above patent, or to spacing by way of welding tools similar to that described in my above identified applications.

Spacing heads can be used with multitip studs, either a single head being applied to the wires as shown at 525 of Figs. 16 and 17 or the wire tips being provided with individual heads, the latter embodiment being chosen when the wires are comparatively long and at a comparatively large distance from each other.

The welding process using heads of this type can be improved in some instances by adding to the paste or other material from which the head is made a flux such as aluminum or iron powder, or a mixture of these agents or others suitable for the purpose at hand. The head can be further improved by adding an explosive such as black powder. The explosion of this component upon initial arc formation speeds up disintegration of the insulating head, quickly removes the insulating material from the stud tip, and also removes material though which the stud may have to be inserted, such as paint or other protecting layer applied to the work piece W, thus bringing the stud into more perfect welding contact. The explosive further develops inert gases such as carbon monoxide or carbon dioxide which protect the welding area. The latter effect can be further enhanced by adding to the head a material which upon heating develops an inert gas.

Headed studs of the above described type can be used with tools according to copending applications Serial Nos. 700,136 and 81,130, in which case the head functions principally as a carrier for the substances which it is desired to apply to the welding area during the welding procedure such as the above-mentioned flux and agents which develop inert gases. Although the head shatters very easily if used in this manner, it may be sometimes preferable to add the above-mentioned explosive in order to promote quick disintegration of the head.

It should be understood that the present disclosure is for the purpose of illustration only and that this invention includes all modifications and equivalents which fall within the scope of the appended claims.

I claim:

1. In the art of welding a stud or wire to a surface, the method which comprises shaping one end of the stud with a tip of essentially uneven surface defining a contact cross section appreciably smaller than the cross section of the stud proper, covering said tip with a breakable and insulating head, contacting said head with said surface, applying a voltage to said stud and said surface, and applying to the stud pressure sufficient to disintegrate said head whereby the contact area becomes ionized to form an arc prior to full metallic contact of said stud and said surface.

2. In the art of welding a stud to a surface, the method which comprises covering the tip of said stud with a breakable and insulating head, contacting said head with said surface, applying a voltage to said stud and said surface, and applying to the stud a percussive blow which shatters said head whereby the area between tip and surface becomes ionized to form an arc prior to full metallic contact of said stud and said surface.

3. In the art of welding a stud or wire to a surface, the method which comprises shaping one end of the stud with a point, covering said point with a breakable and insulating head, contacting said head with said surface, applying a voltage to said stud and said surface, and applying to the stud pressure sufficient to disintegrate said head whereby the area between point and surface becomees ionized to form an arc prior to full metallic contact of said stud and said surface.

4. In the art of welding a small work piece to a comparatively larger work piece, the method which comprises initially inserting between said work pieces a body of breakable insulating material, contacting the body and the two work pieces, establishing connections from said separated work pieces to a source of electric energy and thereupon forcibly disintegrating said body by applying pressure to said small piece thereupon to establish contact between the work pieces.

5. In the art of welding a stud shaped work piece to a surface of a second work piece, the method which comprises: shaping the stud piece to form a tip portion whose effective electrical resistance is appreciably higher than that of the stud proper; inserting between the work pieces an insulating spacing body sufficiently brittle to disintegrate upon said work pieces being forced together, said body defining a gap wide enough to prevent arc formation; establishing electrical connections from said work pieces to a source of electric energy; forcing said work pieces together to disintegrate said body while moving said stud piece towards said surface to cause melting of the tip portion material substantially to remove the tip portion and to establish an arc whose heat causes melting of material of the adjacent stud piece and surface portions; and forcing the stud piece into contact with the surface to fuse the melted metal of the two work piece portions.

6. The method of electrically welding to a surface of a metallic work piece a stud shaped metallic work piece having a shank and a tip, the average diameter of which is substantially reduced as compared to that of the shank so that the electrical resistance of the tip is of the order of four times or more of the resistance of a shank portion of substantially the tip length, which method comprises: spacing the stud piece with the tip from said surface by interposing an essentially brittle and insulating head applied to said tip, which head intially contacts said surface to provide an electrical gap and upon forcible movement of the stud piece thereagainst disintegrates; establishing a potential difference between the work pieces, said gap being wide enough to prevent arc formation at said potential difference; forcing said stud piece towards said surface to cause, before the shank reaches the surface, disintegration of the head, arc formation betwen tip and surface, substantial dissipation of the tip metal, and superficial melting of the opposite shank and surface areas; and forcing the stud piece into contact with the surface to consolidate the melted metal of the two work pieces, whereby substantially all of the consolidated metal is confined between the shank and surface areas.

7. The method of electrically welding to a surface of a metallic work piece a stud shaped metallic work piece having a shank and a plurality of tips, the average diameter of which is substantially reduced as compared to that of the shank so that the collective electrical resistance of said tips is of the order of four times or more of the resistance of a shank portion of substantially the tip length, which method comprises: spacing the stud piece with the tips from said surface by interposing an essentially brittle insulating head applied to said plurality of tips, which head initially contacts said surface to provide an electrical gap and upon forcible movement thereagainst disintegrates; establishing a potential difference between the work pieces, said gap being wide enough to prevent arc formation at said potential difference; moving said stud piece towards said surface at a speed that causes, before the shank reaches the surface, disintegration of the head, arc formation between tips and surface, substantial dissipation of the tip metal, and superficial melting of the opposite shank and surface areas; and forcing the stud piece into contact with the surface to consolidate the melted metal of the two work pieces, whereby substantially all of the consolidated metal is confined between the shank and surface areas.

8. In the art of welding a stud or wire like work piece to another work piece, the method which comprises covering the tip of said stud shaped work piece with a breakable and insulating head, contacting said head with said other work piece, applying a voltage to said work pieces, and applying to the work pieces a force which shatters said head and moves the work pieces towards each other, whereby the contact area becomes ionized to form an arc prior to full metallic contact of said work pieces.

9. A metal stud suitable for welding to a work piece which extends substantially flat beyond the welding locus, comprising a shank portion, a tip portion extending in axial direction from said shank portion and on said tip portion a head covering the tip, said head forming a compact mass of stiff insulating material which is essentially more brittle than said stud and disintegrates when the stud is dealt a blow while the head rests on the work piece.

10. A metal stud suitable for welding to a work piece which extends substantially flat beyond the welding locus, comprising a shank portion, a tip portion extending in axial direction from said shank portion, and on said tip portion a head covering the tip, said head forming a compact mass of stiff insulating material which is essentially more brittle than said stud and which has dispersed therein an agent forming an inert gas upon being heated, whereby the head disintegrates when the stud is dealt a blow while the head rests on the work piece, whereupon the inert gas, formed by the agent heated by the current incident to formation of an arc between stud and work piece, protects the point of welding.

11. A metal stud suitable for electrical welding to a surface of a comparatively thin metal work piece without marring its opposite surface, comprising a shank of substantially uniform cross section and integral therewith a substantially free and unobstructed tip portion with a head which forms a compact mass of stiff and substantially brittle insulating material which disintegrates when the stud is forced towards a work piece, said tip portion being likewise of substantially uniform cross section extending from an end of the shank to a length at least of the order of the length of the shank, said shank and said tip portion being composed of substantially the same kind of metal, the cross section of said tip portion being substantially reduced as compared to that of the shank, and the electrical resistance of the tip portion being of the order of four times or more the resistance of a shank portion of substantially the same length as the tip portion.

12. A stud or pin shaped work piece suitable for welding to a metal work piece, comprising a metal shank portion, and thereon a head covering the tip of said shank portion, said head being a compact mass of stiff insulating material which is essentially more brittle than said stud shaped work piece, protrudes substantially beyond said tip and disintegrates when the work pieces are forced together while the head rests on the other work piece.

13. A metal stud according to claim 12, wherein said head has dispersed therein an explosive promoting disintegration of the head.

14. A metal stud according to claim 12 wherein said stiff and essentially brittle insulating material includes clay and dispersed therein a fusing agent.

15. A metal stud or pin shaped work piece suitable for welding to another metal work piece comprising a shank portion, and thereon a head covering the tip of said shank portion, said head being a compact mass of stiff brittle insulating material which is essentially more brittle than said stud shaped work piece, protrudes substantially beyond said tip and has dispersed therein an agent forming an inert gas upon being heated, whereby the head disintegrates when the work pieces are forced together while the head rests on the other work piece, whereupon the inert gas, formed by the agent heated by the current incident to formation of an arc between stud and work piece, protects the point of welding.

HAROLD J. GRAHAM.

REFERENCES CITED

The following references are of record in the file of this patent:

UNITED STATES PATENTS

| Number | Name | Date |
|---|---|---|
| 1,434,538 | Gravell | Nov. 7, 1922 |
| 2,043,960 | Jones et al. | June 9, 1936 |
| 2,278,569 | Shrubsall | Apr. 7, 1942 |
| 2,315,502 | Crecca et al. | Apr. 6, 1943 |
| 2,402,659 | Nelson | June 25, 1946 |
| 2,432,773 | Lee | Dec. 16, 1947 |

FOREIGN PATENTS

| Number | Country | Date |
|---|---|---|
| 580,757 | Great Britain | Sept. 18, 1946 |